(12) United States Patent
Stefik et al.

(10) Patent No.: US 7,761,409 B2
(45) Date of Patent: Jul. 20, 2010

(54) METHOD AND SYSTEM FOR THE COLLABORATIVE ANALYSIS OF INFORMATION

(75) Inventors: Mark Jeffrey Stefik, Portola Valley, CA (US); Daniel G. Bobrow, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 337 days.

(21) Appl. No.: 11/888,825

(22) Filed: Aug. 1, 2007

(65) Prior Publication Data
US 2008/0250329 A1 Oct. 9, 2008

Related U.S. Application Data

(60) Provisional application No. 60/922,092, filed on Apr. 5, 2007.

(51) Int. Cl.
*G06F 17/30* (2006.01)
(52) U.S. Cl. ..................................... 707/608
(58) Field of Classification Search ............ 707/104.1, 707/10, 608; 709/227
See application file for complete search history.

(56) References Cited

U.S. PATENT DOCUMENTS

| | | | |
|---|---|---|---|
| 5,515,491 A * | 5/1996 | Bates et al. ................. 715/754 |
| 5,819,263 A * | 10/1998 | Bromley et al. ................. 707/3 |
| 6,535,129 B1 * | 3/2003 | Petrick ..................... 340/572.1 |
| 6,678,698 B2 * | 1/2004 | Fredell et al. ............. 707/104.1 |
| 7,293,029 B2 * | 11/2007 | Cope ........................... 707/100 |
| 7,461,151 B2 * | 12/2008 | Colson et al. ................ 709/227 |
| 2003/0050811 A1 * | 3/2003 | Freeman et al. ................. 705/7 |
| 2003/0205534 A1 * | 11/2003 | von Phul ..................... 210/703 |
| 2004/0148192 A1 * | 7/2004 | Morley et al. .................. 705/1 |
| 2004/0203534 A1 * | 10/2004 | Lim ........................... 455/90.3 |
| 2004/0216039 A1 * | 10/2004 | Lane et al. ................... 715/511 |

OTHER PUBLICATIONS

Richards J. Heuer, Jr., "Psychology of Intelligence Analysis," Center for the Study of Intelligence, Central Intelligence Agency, 1999.

* cited by examiner

*Primary Examiner*—Jean M Corrielus
(74) *Attorney, Agent, or Firm*—Patrick J. S. Inouye; Scott E. Smith

(57) ABSTRACT

Methods and systems for enabling the collaborative exchange and analysis of information are provided. Exemplary embodiments provide for the editing of information maintained in associated information units that may be distributed in parallel to a plurality of collaborative users. The information units may be distributed and retrieved with lightweight transport protocols. The information units obtained from multiple sources are automatically aligned and combined. Editing and display methods and systems further provide organizational and filtering tools. The information units may be redistributed and further collected in an iterative fashion.

20 Claims, 12 Drawing Sheets

METHOD AND SYSTEM FOR THE COLLABORATIVE ANALYSIS OF INFORMATION

CROSS-REFERENCE TO RELATED APPLICATION

This non-provisional patent application claims priority under 35 U.S.C. §119(e) to U.S. provisional patent application Ser. No. 60/922,092, filed Apr. 5, 2007, the disclosure of which is incorporated by reference.

FIELD

This application relates in general to computer applications and, in particular, to systems and methods for the collaborative analysis of information.

BACKGROUND

Information is increasingly generated, organized and exchanged electronically. The analysis of that information remains a largely human endeavor. In many contexts, the analysis of information is a collaborative process. Tools for the analysis of information have been largely underdeveloped, imposing upon their human users the responsibility for combining information obtained from multiple sources. The combination of this information may include the reentry of data obtained from various sources and the manual alignment of that data with corresponding information obtained from another source. The reentry and alignment of data is time-consuming and error-prone. Further, assuming that the data is eventually entered accurately and properly aligned, the tools must be present to contrast, compare and analyze that information.

Generalized office applications exist that provide some collaborative functions. For example, Microsoft Word and Microsoft Excel, both provided by Microsoft Corp. of Redmond Wash., include some capability for the collaborative editing of a shared data file. The general paradigm of these systems is to either pass data files from user to user for sequential revision or to share a common data file at a central location, where it can be edited by a plurality of authorized authors. The most recent version of the edited data is presented by the user interface. There is some capability for viewing the revisions that led to that most recent version of the data if specifically configured to track changes. When the changes are tracked, the data may be accepted in present form or rolled back to the state of the edited item before revision. These systems also provide a limited merger capability for combining edits made in parallel to a common base file. The merger operations appear to work by finding sections of literals, sometimes referred to as anchors, that are contained in both source files and determining the differentials between the anchors to generate a combined result for display. The merger of parallel edits to data files present concurrency challenges that conventional systems apparently have had difficulty addressing.

Systems directed to information analysis known to exist are directed towards individual users and are presently difficult to use in collaborative environments without significant manual intervention. An example of one of these tools is the Analysis of Competing Hypothesis program ("ACH") provided by Xerox Parc of Palo Alto, Calif., and available for download at http://www2.parc.xerox.com/istl/projects/ach/ach.html. Version 2 of the ACH program is a tool primarily employed by the intelligence communities to analyze competing hypotheses by breaking out, commenting and scoring evidence values associated with each hypothesis. The ACH program is organized in a tabular format, with each hypothesis represented by a column, each evidence under consideration represented by a row, and various evidence values associated with each hypothesis represented by a value cell. Version 2 of the ACH program, including its associated help files, are incorporated herein by reference.

There exists a need for a collaborative information and analysis system that automatically aligns data from multiple users. A system that is lightweight in its requirements, easy to use and administer, flexible in its presentation of values and accurate in its combination of values added, deleted or changed by a plurality of contributors would be particularly advantageous.

SUMMARY

Methods and systems for the collaborative analysis of information are provided. Information units are maintained in analysis datasets. Each analysis dataset includes at least topic information unit. The topic information unit represents an analysis topic. Participants in the collaboration provide and associate information contributions that are pertinent to the analysis topic. A contribution information unit represents each information contribution and is associated with the topic information unit to which the information contribution pertains.

When individuals collaborate, they can combine information systematically. In an embodiment, the program systematically combines instances of information units from different individuals. Participants in the collaboration process each work on a local instance of the analysis dataset. These individual instances are combined into a combined analysis dataset that includes a unique instance of each topic information unit, together with a unique instance of each contribution information unit that is associated with each of the topic information units.

An embodiment assigns a unique identifier to each information unit when it is created. The unique identifiers provide an immutable, persistent identification for information units. The embodiment uses the identifiers to recognize and align information when it is passed back and forth among collaborators.

One of the contribution information units is designated as a top-level value when there are more than one combination information units is associated with a topic information unit. When information units from different collaborating users are combined, there may be more than one contribution information value associated with a given topic information unit. For example, the user may have entered the code "red" for a contribution value, while two of his collaborators entered as contribution values different codes such as "blue" and "green" for the same topic information unit. The system needs to determine which of these values to show in the user's display as the "top-level" or showing value for the information unit. This invention describes methods by which a user can inspect multiple competing values for an information unit, and also control which of the competing values will be shown at a given time in a display as the top-level value.

Other contribution information units associated with topic information units are accessible through detailed display user interfaces. The presentation of an organization of the topic information units and contribution information units is configurable via filters and preferences. These display configurations may be defaulted by an administrator or individually configurable by a contributor in their own point of view display. An embodiment of the invention also provides documentation indicators to indicate the presence of information units in the analysis dataset meeting a filter criterion, or indicating that information units meeting a filter criterion are not presently displayed within the graphic portion of the user interface.

Still other embodiments will become readily apparent to those skilled in the art, including known substitutions, alternative code structures or hardware encompassing the claimed methods and systems any other modification to the details of the embodiments that do not depart from the spirit and the scope of the claims. Accordingly, the drawings and full content of this specification are to be regarded as illustrative in nature and not as restrictively representing the only embodiments that the claims are intended to encompass.

DETAILED DESCRIPTION

Exemplary Computer System and Network

Figure 1:
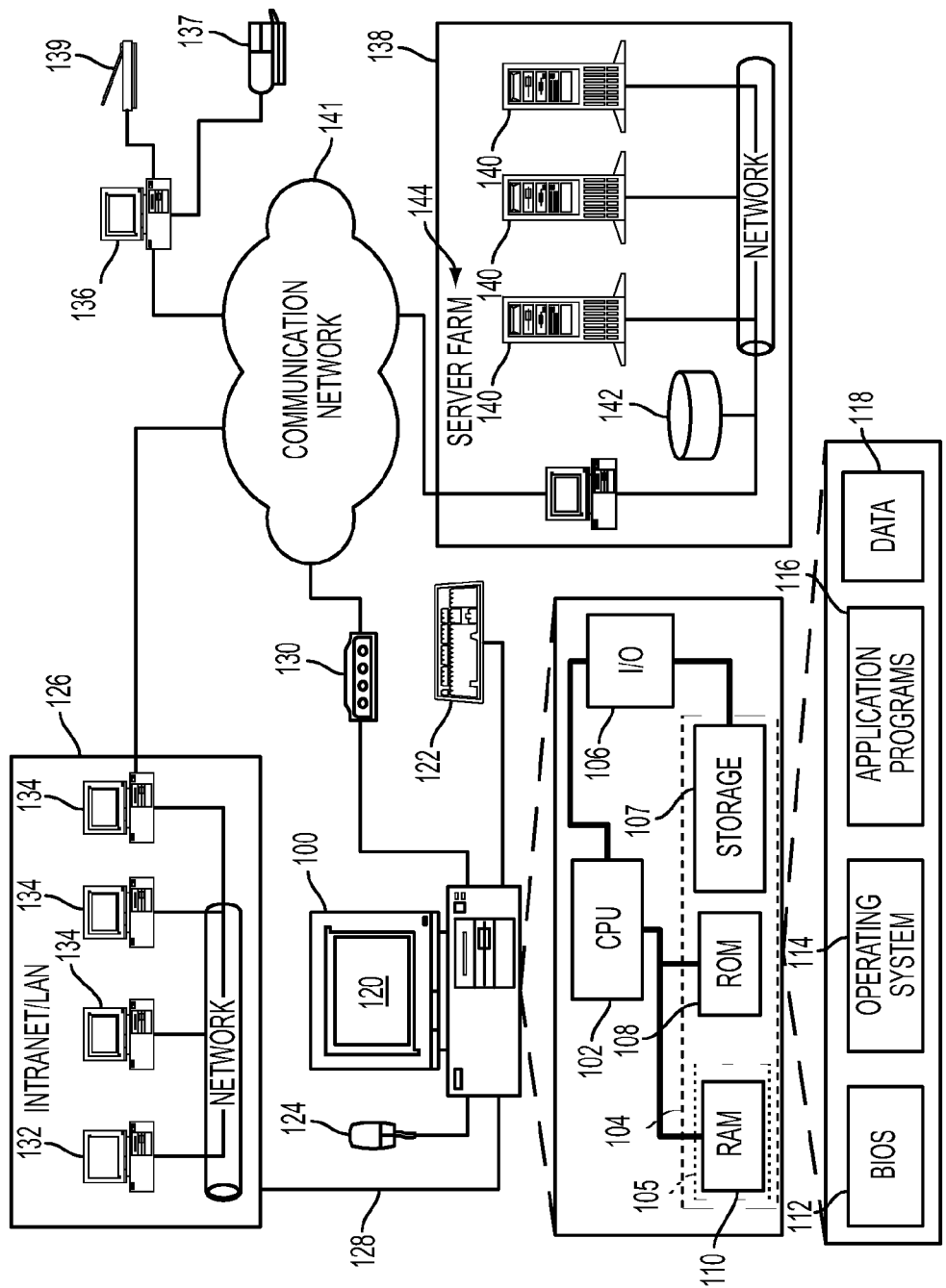
FIG. 1 is a block diagram of an exemplary computer system.

The block diagram shown in FIG. 1 illustrates an exemplary computer system. A computer 100 includes a central processing unit (CPU) 102, a system memory 104, and input/output (I/O) ports 106.

The system memory 104 includes working memory 105 and storage memory 107. The working memory 105 is generally addressable by the central processing unit (CPU) 102 and includes random access memory (RAM) 110. The CPU 102 can read from and write to RAM 110 at or near bus speeds. The CPU 102 can also read from, but not write to, read-only memory ROM (108), which is generally used to provide the CPU with very fast access to non-volatile information required at start-up or during operation of the computer 100.

The system memory 104 contains a basic input/output system (BIOS) 112 for administering the basic input and output between components of the computer, an operating system 114 for providing the basic software services provided by the computer and application programs 116 that provide the functionality for performing specific tasks with the computer. Data 118 may be stored and manipulated in the system memory 104 by any of the BIOS 112, operating system 114 and application programs 116.

The computer 100 has a display 120 for output of information and input devices, such as a keyboard 122, or a pointer device, such as a mouse 124. Suitable computers include conventional mainframe computers, server computers, personal computers, notebook computers, handheld computers, personal digital assistants, personal information managers, and hybrid devices incorporating computer capabilities, such as cable boxes, newer cellular telephones, and pagers.

The computer may be connected to a local area network (LAN or intranet) 126 through a network connector 128 or through a modem 130. A LAN 126 includes a server computer 132 and a plurality of client computers 134, which are all functionally similar to computer 100. The computer 100 or the LAN 126 may be connected to other computers 136 or other networks 138 through a communication network 141 to form a wide area network (WAN). The Internet is an example of a large scale WAN that connects together many computers 100.

Server computers 140 (functionally similar to computer 100 but generally more powerful) store application programs 116 and data 118 that are communicated to other computers for instance, 100, 134 and 136 connected to a network. In some cases, server computers 140 are interconnected to form parallel processing networks. These networks are designed to process applications concurrently by dividing tasks along the various server computers and combining results. The dividing, processing and combining of results may be accomplished many times while an application runs. Various peripheral devices, such as a scanner 139 or a printer 137, may be attached to any of the computers for input or output to or from local or network sources. Server computers 140 may be grouped together as server farms 144. The server computers 140 may all access storage 142, such as magnetic or optical disc arrays.

The methods and systems of the present invention configure computer hardware, for example, computers 100, 134 or 140 by way of computer instructions stored as application programs 116 or firmware made part of a computer system ROM 108 or other physical components.

Overview of Exemplary Embodiments

As described in detail below, the present invention provides methods and systems for the collaborative exchange and analysis of information. Persistent unique identifiers are assigned to information units. These unique identifiers enable the system to automatically align data elements across multiple users, multiple versions of datasets, or both. The system may maintain or create one or more datasets to keep track of alternate values for each data element. In an embodiment, information units are grouped into datasets stored in computer files. The data files are in exchanged using a commonly available transport mechanism, such as e-mail, FTP, or shared folders.

Figure 2:
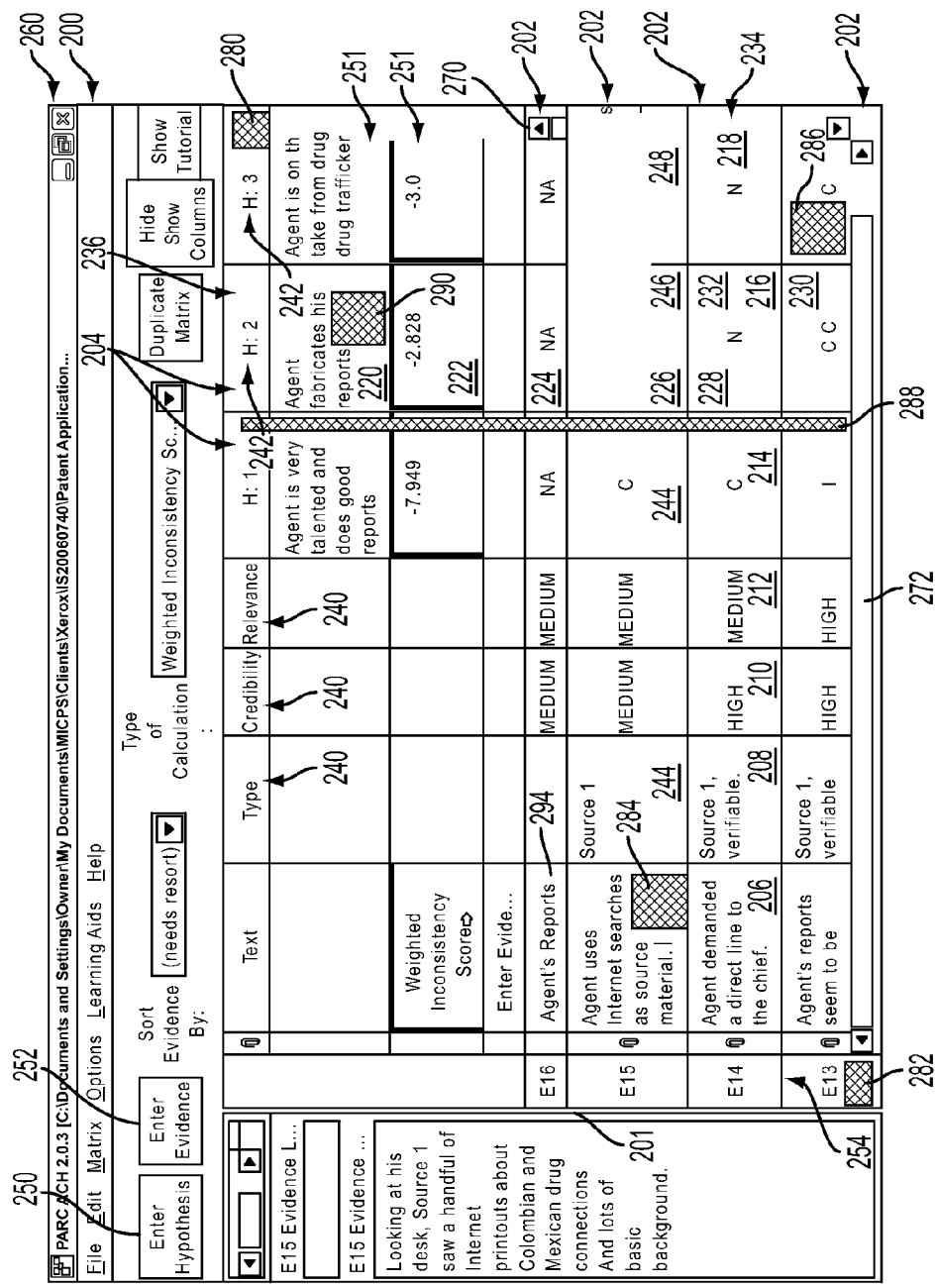
FIG. 2 is exemplary user interface provided by an embodiment of the invention.

FIG. 2 illustrates an exemplary user interface 200 provided by an embodiment of the invention. The example shown is an extension to the ACH program to add collaborative capabilities in accordance with some aspects of the present invention. The collaborative ACH program is a tool useful to intelligence agencies and others interested in a systematic and comprehensive analysis of information, and is only one of many possible examples. The example presents the scenario that an analysis of the reliability of an intelligence agent is being conducted.

The information is organized into information units that progressively associate or containerize information. The information units include row information units 202 and column information units 204. Both row information units 202 and column information units 204 may have a plurality of associated cell information units 206-218 and 220-230, respectively. A row information unit 202 and a column information unit 204 are examples of container information units. A cell information unit may be associated with one or more container information units. For example, cell information unit 228 is associated with the row information unit 234 and the same cell information unit, alternatively labeled 216, is associated with the column information unit 236.

A row information unit 202 may have associated fields 240. A field 240 will generally be represented by an information cell 244 that allows entry of values that are intended to be associated with each instance of a row information unit 202. These fields 240 are generally preconfigured for a given type of row information unit, but in depending on the application, the user may be given the ability to add, delete or edit fields 240. The row information unit may become associated with a variable number of column information units 242. The insertion of a column information unit 204 results in the association of a cell information unit 224 with that row information unit 201 and the column information unit 204. Selection of a column insertion interface element 250 inserts a new instance of an insertable field column 242. Similarly, selection of a row insertion interface element 252 inserts a new instance of a row information unit 254.

In the context of the example, information relevant to the reliability of the intelligence agent is entered into a sheet 260. The information is divided into evidence and hypotheses. Evidence values are assigned to row information units 202. The row information unit 202 is associated with cell information units 206-218. Cell information units 206-212 represent fields 240 that provide space for the entry of information that describes the evidence. For example, cell information unit 206 contains a text description of the evidence, cell information unit 208 documents the source of information, cell information unit 210 assigns a metric to the reliability of the information and cell information unit 212 assigns a metric to the reliability of that information.

The example also illustrates a plurality of hypotheses, each represented by an insertable column information unit 242. The column information unit 242 is divided into cell information units 220-230 associated with column fields that provide space for the entry of information that describes each hypothesis. Cell information units 206-212 represent fields 251 that provide space for the entry of information that describes the hypothesis. For example, cell information unit 220 contains a text description of the hypothesis. Cell information units 224-230 are also associated with the evidence row information units 202, as displayed by their intersection. These cell information units 224-230 represent information linking the evidence associated with the row information unit 201 to the hypothesis associated with the column information unit 236. For example, a cell information unit 230 contains a metric that is associated with both the evidence role information unit 254 and the hypothesis column information unit 236. Some of the cell information units may calculate a value derived from the entries made in other associated cell information units. For example, a weighted inconsistency score is calculated in cell information unit 222 from weight values specified in cell information units 224-230.

Collaboration Interfaces

Among the strengths of project collaboration is the opportunity to coordinate facts and interpretations provided by multiple sources. While the following discussion is stated in terms of human collaborators, these sources may include either or both automated and human contributions. An administrator or collaborator may contribute to the organization of the information displayed through the user interfaces. Each collaborator potentially contributes their own perspective, which may include differing information and opinions of importance assigned to information. While the ultimate goal of the collaboration may be consensus, the steps to that consensus are advantageous to document, since even the consensus may evolve as contributions are made and analyzed. For example, as collaborators add evidence through row information units 202, contribute hypothesis by adding column information units 204, or modify interpretive information in cell information units 206-214, 220-230, the ability to filter and retrieve contributions by source or other criterion may have significant value.

The values entered in the information units may change over time as the analysis is developed. Those changes may include a contributor's revisions to their own or other's contributions. Comments or questions may be appended to other's contributions. A collaborative system may involve the development, ranking, sharing and other analysis of information from the possibly differing perspectives of the participating users. Each user may have preferences for inclusion, phrasing and ranking. Information units subject to collaboration are referred to as topic information units. For example, a topic information unit may be a row information unit 202, a column information unit 204 or a cell information unit 206-214, 220-230. The values contributed to the collaboration by the collaboration participants are generally referred to as contribution information units.

An analysis dataset includes the topic information units and the contribution information units. The contents of the analysis dataset are displayed in a hierarchy of user interfaces. Local instances of the user interfaces are generally configurable each collaboration participant, giving the collaboration participant their own point of view display. The point of view display might appear as a document for text-based collaborative analysis or a sheet for a tabular-based collaborative analysis. While working on their own points of view, each collaboration participant works from and potentially modifies their own local analysis dataset. For example, while working from a common base sheet 260, a participating collaborator may alter the values contained in the individual cell information units 206-218 and 220-230, add, delete, or modify either or both column information units 204 and row information units 202. An administrator may periodically combine the local analysis datasets and conform a new base point of view document or sheet from which further modifications can be made in a possibly iterative process.

Figure 3:
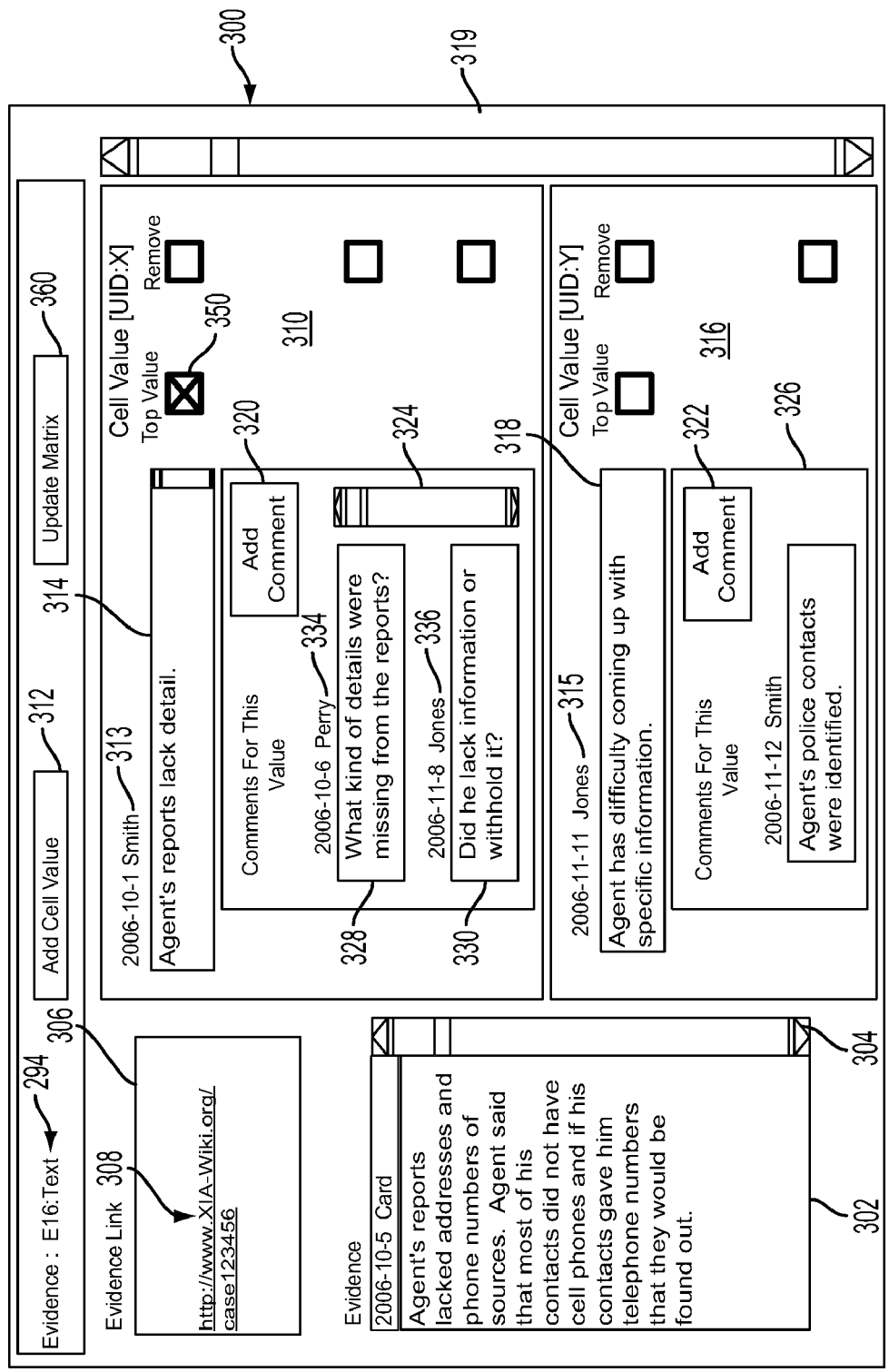
FIG. 3 is an exemplary detail interface.

The basic usage of the user interfaces is discussed with reference to FIG. 3. An exemplary detail interface 300 is shown. The detail interface 300 is one example of an interface that exposes detail information that is associated with a topic information unit. There may be a plurality of interfaces that allow for a collaborating user to "drill-down" through information that is better grouped and displayed together and hidden or partially hidden at upper level interfaces. For example, the detail interface 300 allows for the entry and editing of multiple cell values 310 and 316 that are associated with a cell information unit 294. Cell value 310 is designated as the "top-level" value for display in the user interface 200 within cell 294, where the text appears truncated because of limited display space. In FIG. 3, the top-level value 310 is displayed in expanded form within an evidence textbox 302. As with all display elements, a scrollbar 304 may be associated with the text box 302 to enable display of the full text associated with the evidence value. Interface elements, such as link box 306 may also be included for the specification and display of external associations to value information units. For example, a URL 308 provides a link to a Wiki entry discussing the top-level evidence value 310.

In our example, two contributors have each entered the text of evidence value E16 as cell values to be associated with cell information unit 294. The example shows the work product of the various contributors through several iterations of the collaboration. Agent Smith added a cell value entry box 310 by selecting an interface element 312. In a cell value text box 314, agent Smith inserted his suggestion of the proper cell value. His contribution is labeled 313 with identifying information. Agent Jones added a cell value entry box 316, where she entered her version of the appropriate cell value in a cell value text box 318. Her contribution is labeled 315. The information used for the labels may be generated by the system or obtained through a user login. The information need not be personally identifiable to the user, such as when security considerations necessitate anonymous contributions. The detail interface 300 provides a scrollbar 319 to permit movement to anyone of a plurality of cell value frames 310, 316.

Further level interfaces may also be provided for displaying supporting information to associated higher-level information. The details of this supporting information may not be viewable from higher-level displays, but the existence of this information may be indicated at the user display through a documentation indicator, described below. To access this supporting information, navigation elements in the interface may be provided. Each parent form may be considered a higher-level form relative to its child (or detail) form, with the ability to specify top-level values in the child form for display in the parent form. For example, comments pertaining to a particular cell value 310 may be added by selecting a comment add interface element 320. Comments 328-330 are grouped within a comments frame 324. Each comment is associated with identifying information 334-336. The comments frame 324 and its contents may be displayed as part of the interface 300, or a navigation element provided in interface 300 could cause a child interface (not shown) to display the comments frame 324.

Figure 4:
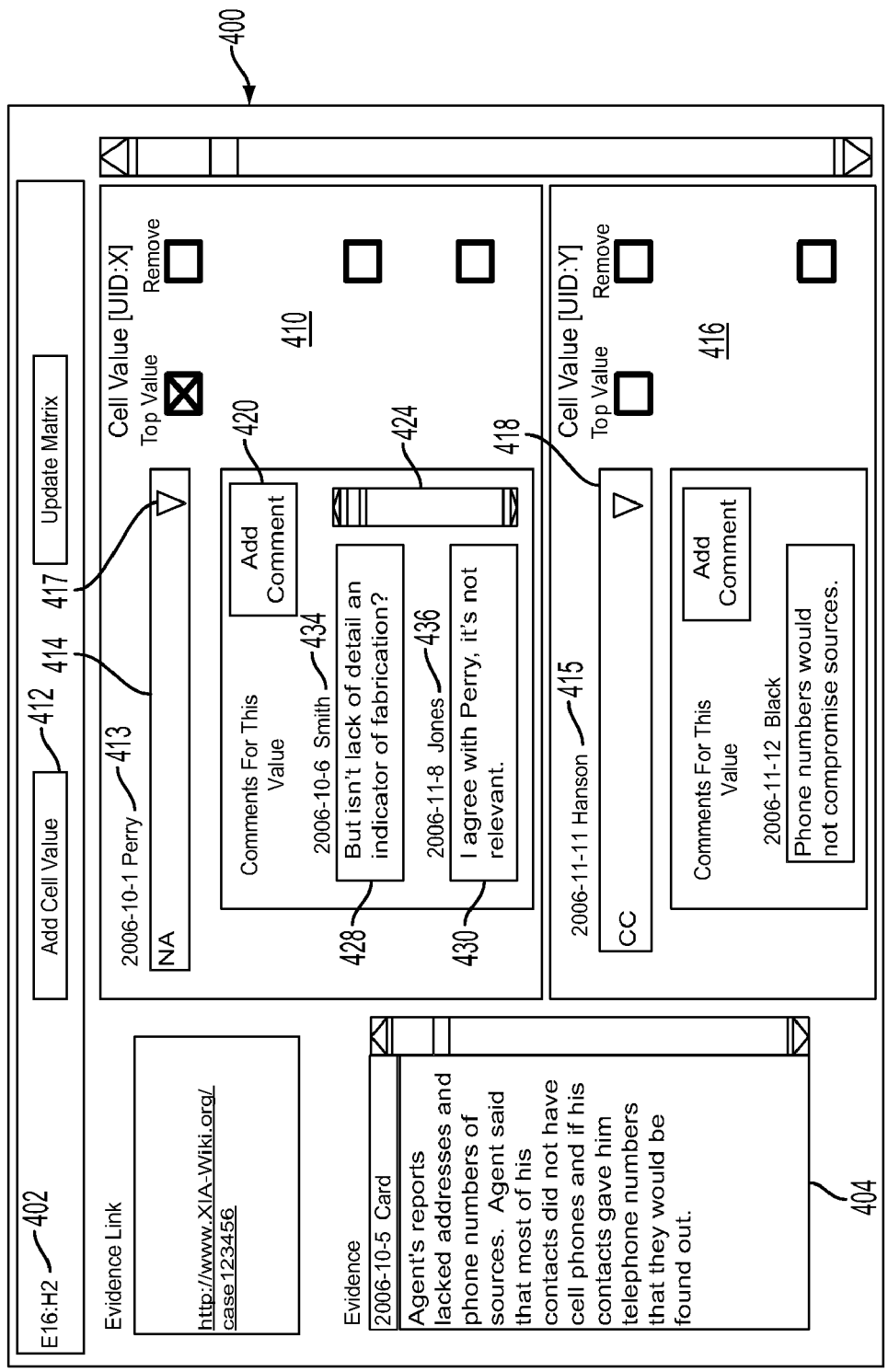
FIG. 4 is an exemplary cell-editing interface.

Another example of a cell-editing interface 400 is shown in FIG. 4. The cell-editing interface 400 is configured to add, remove or edit value information units associated with a cell information unit 402 that represents an intersection between a row information unit 202 and a column information unit 204. In the example, as indicated by label 402, the cell-editing interface is configured to edit the intersection of evidence value E16 (represented by row information unit 201) and hypothesis information unit H2 (represented by column information unit 236). The information value associated with this cell information unit 224 is selected from a predefined set of values that are each associated with weighting values. In the example, two collaborating users have each entered a cell value to be associated with cell information unit 224, representing the relevance weight to be associated with the evidence value E16 applicability to the hypothesis H2. Agent Smith has added a cell value entry box 410 by selecting an interface element 412. In a cell value drop down box 414, agent Smith selected his opinion of the proper cell value from a list displayed when he selected the drop down arrow 417. His contribution is labeled 413 with identifying information.

Agent Jones also added a cell value entry box 416, where she selected her opinion of the appropriate cell value in a cell value drop down box 418. Her contribution is labeled 415. Comments pertaining to a particular cell value 410 may be added by selecting a comment add interface element 420. Comments 428-430 are grouped within a comments frame 424. Each comment is associated with identifying information 434-436.

Administrative Editing and Saving

The collaborative process often involves a plurality of individual users working on their own instances of a common analysis dataset and a commonly configured base sheet. The information associated with these instance analysis datasets and base sheets can be stored in any conventional means, including database entries, computer files stored on local computers or on a computer network, Wiki files and XML sheets available from Web services. Periodically, the instance sheets, analysis datasets, or both, from the collaborative users are accumulated, combined and possibly conformed. The resulting next generation information file often serves as the starting point for the next round of an iterative process. In other embodiments, only the analysis datasets are transported for combination.

Administrative functions are provided to configure the display of the accumulated information in the various user interfaces. The administrative functions are available to individual users as they work with individual instances of information sheets and to managing users working with combined information files, unless restriction of administrative function for certain classes of users is otherwise desirable. For example, referring to FIG. 3, several cell values 310, 316 are shown for the evidence (E16) text value 294 (FIG. 2). The cell value 310 associated with a checkbox 350 is designated as the "top level" value. The top-level value may be thought of as the consensus value of the analysis until changed. The top-level value is also displayed in the cell information unit 294 of the parent sheet 260 when the parent sheet 260 is loaded or when an "Update Matrix" interface element such as button 360 is selected.

Other examples of administrative functions include the ability of the user to specify which of the information units are in view and which of the information units the user would need to scroll to bring that information unit into view. For example, the user can specify that row information units associated with evidence values E16 and E13 and column information units associated with hypotheses values H1 and H4 (not shown) are viewable in the information sheet 260 without needing to scroll using interface elements such as scroll bars 270-272.

Administrative save functions are also provided. Information units can be saved to analysis datasets according to filter criterion. For example, collaborative users may be provided with datasets that include only those information units tagged with meta-data indicating a security clearance level at or below a security clearance level associated with the collaborative user.

Information Unit Structure

Figure 5:
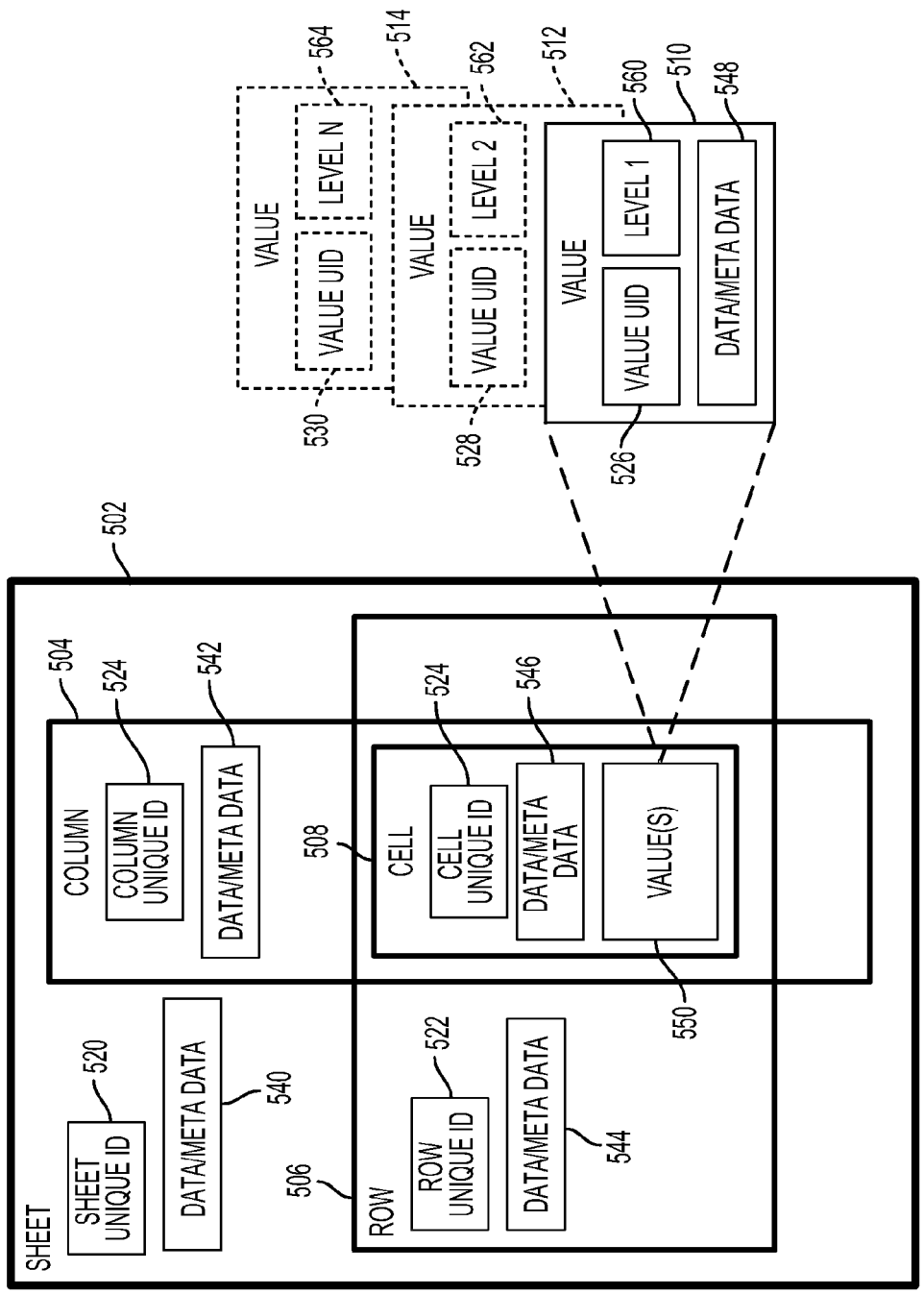
FIG. 5 is a block diagram of exemplary information units.

The structure of some possible information units are described beginning with FIG. 5. These information units include a sheet information unit 502, a column information unit 504, a row information unit 506, a cell information unit 508 and a plurality of cell value information units 510-514. One possible application of these information units 502-514 is shown in FIGS. 2 and 3 as an ACH sheet 260, hypothesis columns 236, evidence rows 202, information cells 206-214 and 220-230 and cell values 310, 316, respectively. While the information units are presented in FIG. 5 in a tabular arrangement, there is no requirement that the information units have a tabular arrangement or associations.

Each information unit 502-514 is assigned a unique identifier 520-530. The unique identifier uniquely identifies its associated information unit 502 within the collaborative environment, which may include the combination of information units 502-514 created or altered by a number of collaborating users using the same or differing computers 120, 134, 136. The unique identifiers are used, in part, to track and combine the information units as discussed below with reference to FIGS. 8 and 9. Depending on the desired granularity of the tracking and combination functions, the unique identifier may be omitted from some of the information units.

Each information unit 502-514 may be associated with data, meta-data or both 540-548. For example, meta-data may include information about information, including the association of other information units or positional information associated with the information unit when displayed. Data 540-548 might include fields that are intended to be associated with each type of information unit, such as fixed cell information units 206-212 (FIG. 2). Some of the information units 502-508 may be designated as containers to track and contain values during collaboration. For example, the cell information unit 508 includes a field 550 that may be associated with zero or more value information units 510-514. A Level field 560-564 is illustrated for each of the value information units. In an embodiment, the Level field 560-564 is associated with a value used to specify that the value is currently the top-level value and may alternately indicate its relative position in a hierarchy of values.

Collaborative Editing

Figure 6:
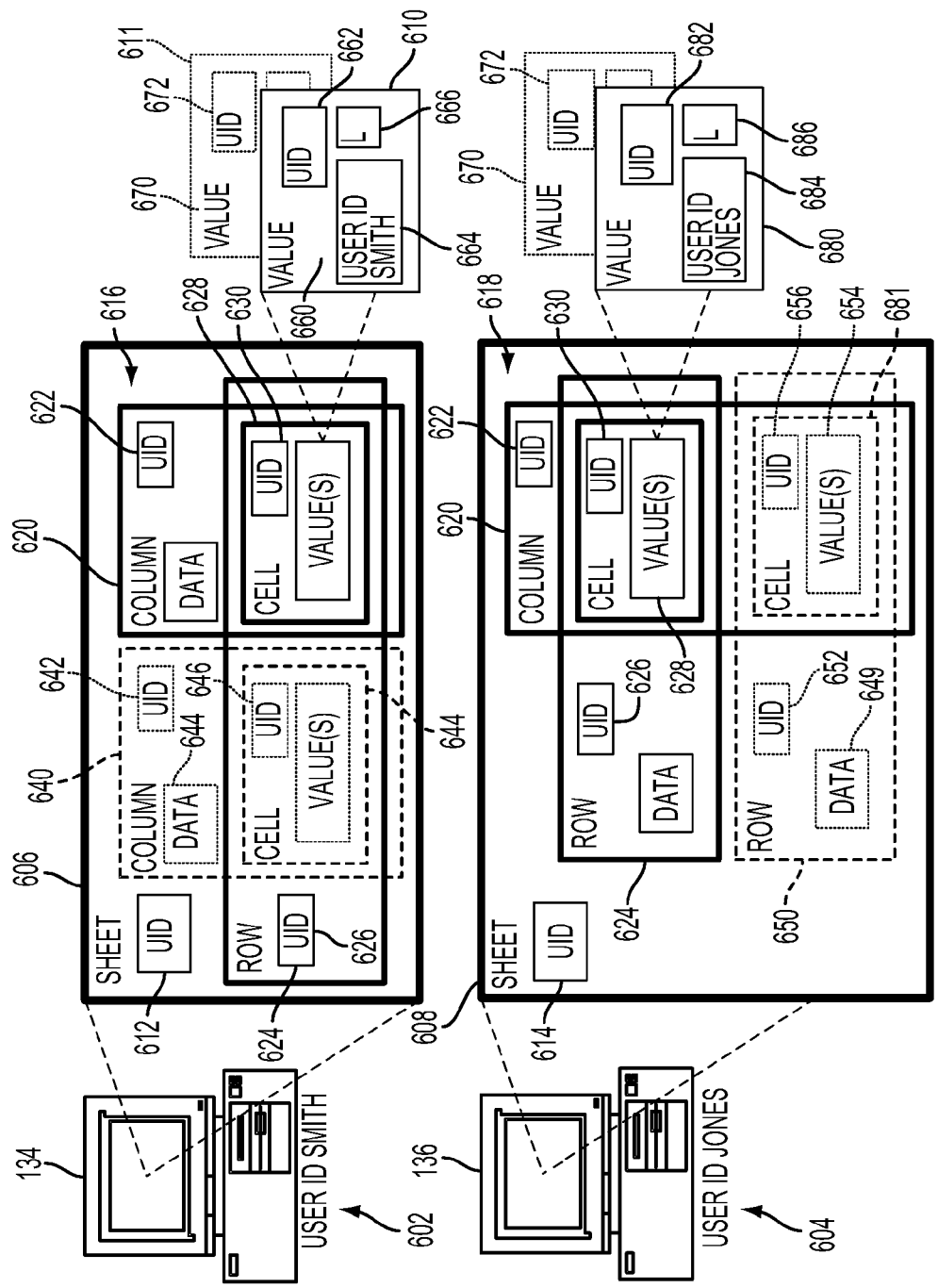
FIG. 6 is a block diagram of an exemplary collaborative analysis process.

An example of the collaborative editing process is illustrated beginning with FIG. 6. The example presents only one of many possible scenarios. While scalable to many collaborative users, the example describes only two for clarity. Collaborative user Smith 602 works on computer 134 and collaborative user Jones 604 works on computer 136. Computers 134-136 each run an application program 116 incorporating an embodiment of the invention. The embodiment may be run via other means, such as running thin clients accessing Web services.

Each collaborative user 602-604 is provided with a local sheet 606-608. The local sheet 606-608 is a copy of a base sheet that serves as a base point for collaborative analysis. The local sheets 606-608 each have an associated unique identifier 612-614 that is set to the same value to signify their being instanced from the same base sheet. The base sheets 606-608 also initially share a common set of information units 616-618. From this common base point, the collaborative user 602-604 contributes to the collaborative analysis by adding to, deleting from, or editing the information units 610-611 associated with their local sheet 606-608. The ability of a collaborative user to add, edit or delete certain types of information units 610-611 may be restricted by administrative preferences. The local sheets 606-608 may later be combined to form a new base sheet for discussion or further revision, in a potentially iterative process.

In the example illustrated in FIG. 6, collaborative user Smith 602 works on local sheet 606, while collaborative user Jones 604 works on a local sheet 608 copied from the same base sheet. Both local sheets 606-608 share the same unique identifier. Initially, the information units 616 and associated with the local sheet 606 and the information units 618 associated with the local sheet 608 are the same. The information units 616-618 have a column information unit 620 with an associated unique identifier 622 and a row information unit 624 with an associated unique identifier 626. A cell information unit 628 with an associated unique identifier 630 is associated with the column information unit 620 and the row information unit 624. The value of the unique identifier set for each of these information units 622, 626 and 628 in local sheet 606 is initially set to the same value as their corresponding information units in local sheet 608. As long as the column information unit 620, row information unit 624 and cell information unit 628 remained unedited, their respective unique identifiers 622, 626 and 630 will remain unchanged.

From this base point, collaborative user Smith 602 adds a column information unit 640, which is initialized with a new unique identifier value assigned to unique identifier field 642. Text used to identify the column is assigned to a data field 644. Necessary or implied child information units may then be automatically instantiated and assigned to the column information unit 640. For instance, a cell information unit 644 is instantiated and its unique identifier 646 set to a new unique value. A reference may also be set at this time to the cell information unit's 644 associated column information object 640 or its associated row information unit 624 or both.

Collaborative user Jones 604 adds a row information unit 650, which is initialized with a new unique identifier value assigned to unique identifier field 652. Text used to identify the row is assigned to a data field 649. Necessary or implied child information units may then be automatically instanced and assigned to the row information unit 650. For instance, a cell information unit 681 is instanced and its unique identifier 656 set to a new unique value. A reference may also be set at this time to the cell information unit's 681 associated row information object 650 or its associated column information unit 620 or both.

In an embodiment of the invention, changing a data field associated with an information unit results in a new unique identifier being associated with that information unit. For example, changing a data field 644 associated with a column information unit 640 results in a new unique identifier being assigned to unique identifier field 642. A change to a row information unit's 650 data field 654 would similarly result in a new unique identifier being associated with the unique identifier field 652.

The addition of a value information unit to a cell information unit generally does not require a change in the unique identifier value assigned to that cell information unit. In the example, collaborative user Smith 602 adds a value information unit 660 to a local instance of cell information unit 628. A unique identifier is assigned to the unique identifier field 662 associated with the new value information unit 660. A user identification for collaborative user Smith 602 is captured by a user login or otherwise assigned by the system. The user identification need not be personally identifiable to a collaborative user. If available, the user identification is assigned to a user identification data field 664. The value information unit 660 may, for instance, represent a cell value contributed by Agent Smith for cell information unit 294 (FIG. 2), shown in more detail as value information unit 310 (FIG. 3). Agent Smith's contribution defaults to "top level", which is maintained by a level field 666. The level can be changed 350 at a later time by Agent Smith, other collaborators or an administrator. Other value information units 670 may have been contributed by Agent Smith, or others participating in the collaboration process and associated with the cell information unit 294. Each of those existing value information units has its own unique identifier maintained in a unique identifier field 672.

Continuing the example, collaborative user Jones 604, working from her own instance of sheet 608, adds a value information unit 680 to the local instance of cell information unit 628. A unique identifier is assigned to the unique identifier field 681 associated with the new value information unit 680. A user identification for collaborative user Jones 604 is captured by a user login or otherwise assigned by the system. The user identification need not be personally identifiable to a collaborative user. If available, the user identification is assigned to a user identification data field 684. As above, the value information unit 680 may, for instance, represent a cell value contributed by Agent Jones for cell information unit 294 (FIG. 2), shown in more detail as value information unit 316 (FIG. 3). Agent Jones' contribution defaults to "top level", which is maintained by a level field 686. The level can be changed at a later time by Agent Jones, other collaborators in their own local instances of sheets or an administrator working on a combined base sheet. Other value information units 670 may have been contributed by Agent Jones, or other participating in the collaboration process and associated with the cell information unit 294. Each of those existing value information units has its own unique identifier maintained in a unique identifier field 672.

Analysis, Transport and Combination

Figure 7:
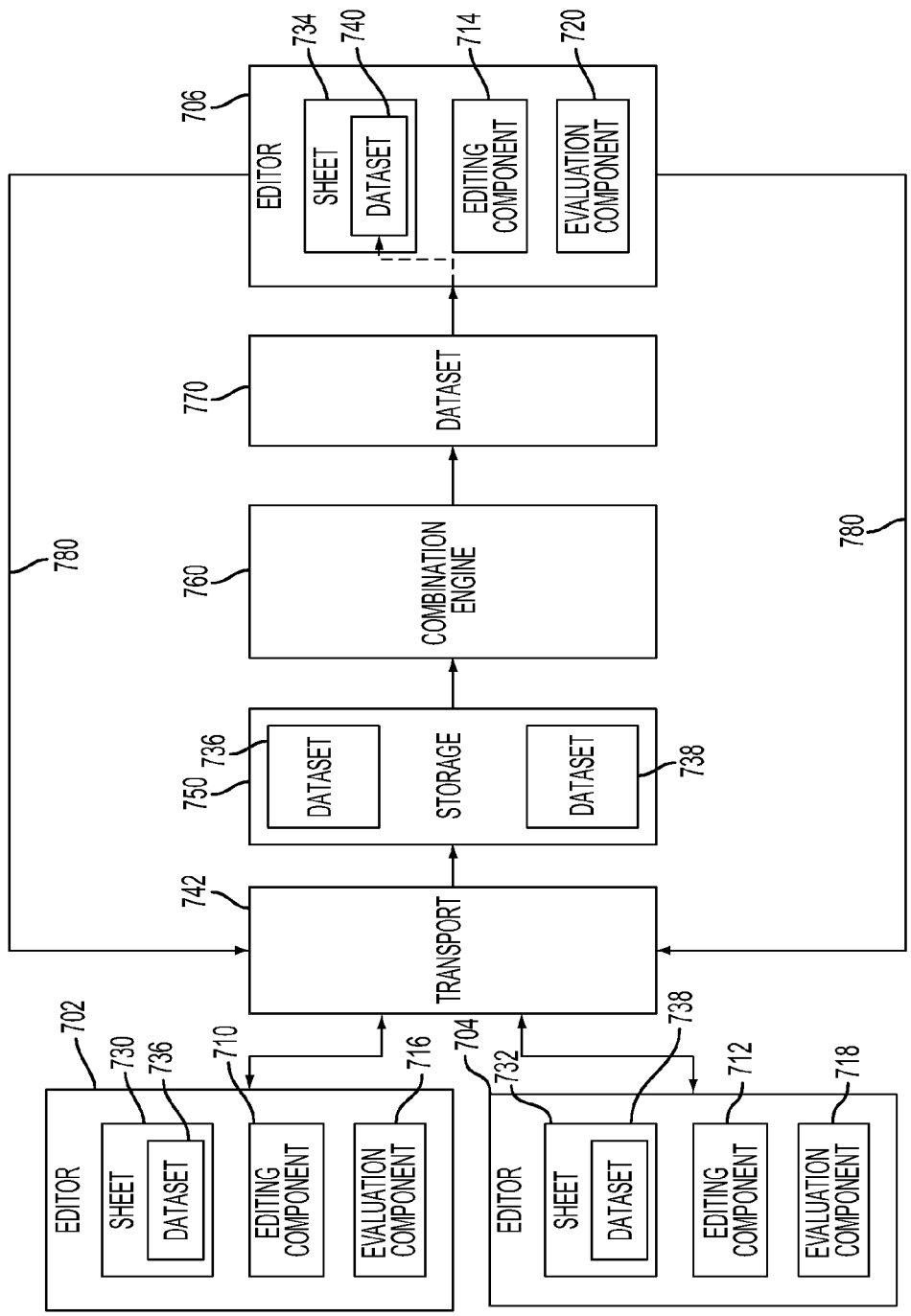
FIG. 7 is a block diagram of a collaborative information analysis system.

FIG. 7 illustrates provided components that may be included separately or in different combinations in the various embodiments of the invention. An editor application 702-706 is provided to each collaborative user. The editor application 702-706 includes an editing component 710-714 and an evaluation component 716-720. The editing component 710-714 includes text, data entry and formatting functions similar to conventional word processing and spreadsheet applications. The evaluation component 716-720 provides systems and methods for the analysis of data. For example, the evaluation component 716-720 provides alternative user interfaces such as those shown in FIGS. 3 and 4 that present information in hierarchical detail and allow for the specification of what information is to appear in higher-level interfaces and potentially in what order. For example, the selection of top-level checkbox 350 (FIG. 3), allows the user to specify that the information of cell value 310 be displayed in cell box 294 shown in the user interface 200 (FIG. 2).

The evaluation component 716-720 may also provide filtering functions. Filters may specify the inclusion or exclusion of any available information unit from display, load or save operations. For example, a collaborative user may specify that only those information units provided by certain collaborative users be displayed. A collaborative user may choose to display only entries made since a specified date, those with an indicated priority value or greater, or based upon analysis of meta-data associated with the information. The editor applications 702-706 need not all have uniform-abilities. Editor 706 may have a full set of capabilities when provided to the administrator of the collaboration, while a senior contributor receives a moderately enabled editor 704 and a junior contributor receives a minimally enabled editor 702. The capabilities of these differently enabled systems might include restrictions on filtering, viewing, editing or the saving of information objects. The ability to combine datasets from collaborating users may also be limited to those with administrative privileges.

A sheet 730-734 is broadly defined as a container object for a dataset 736-740 and, in context, as the visual object that displays the information units contained in the dataset 736-740 in the editor 702-706. A sheet 730-734 may maintain user preference for display, such as font size, environment colors and documentation indicators. The dataset 736-740 maintains a current set of information units associated with collaboration and independently editable by the local collaborative user. Information units may also be added or deleted from this local dataset 736-740. The sheet 730-734 may be stored together with, or separately from, their associated dataset 736-740. For example, the dataset 736-740 may be stored in a local or network database, as a Wiki entry accessible via the Internet, as a XML file available from a Web service, in a local computer folder or as a file stored in a shared directory.

A transport-managing component 742 manages the transport of copies of datasets 736-738 from the individual collaborating users to a central storage 750. A lightweight transport component 742 may include an agreed protocol to forward datasets 736-738 as an attachment to an e-mail addressed to an administrator or an administrator designate such as a daemon. A transport component 742 may also utilize conventional network protocols for the retrieval of datasets, files or electronic documents from computers 134, 136 or servers 140 via a communication network 141 or intranet 126 (FIG. 1) by an administrator or administrator program. The datasets may be encrypted before transport for security purposes. Another option is to transmit datasets via encrypted channels, such as a virtual private network. In high security environments, the transport component 742 may fully implement secure transport mechanisms using either private or public communication media.

The central storage 750 makes the datasets 736-738 available to a combination engine 760. The combination engine 760 combines the datasets 736-738, which may come from many collaborating users, into a combined dataset 770. The combination engine 760 may be made part of the administrator's editor 706 or may be an independent program residing on a computer such as a server 140. Generally, the combined dataset 770 includes a copy of each unique information unit contained in the datasets 736-738 that have been combined. The combined dataset 770 is then made available for editing and evaluation by the administrator using editor 706. As part of the evaluation, the administrator may evaluate and set the formatting values for the information units, for instance by setting the starting "top level" values as discussed above with reference to FIG. 3. The combined dataset 770 may then be used as base dataset for a next iteration 780 of the collaborating process by sending the base dataset to the collaborative users via the transport component 742.

Figure 8:
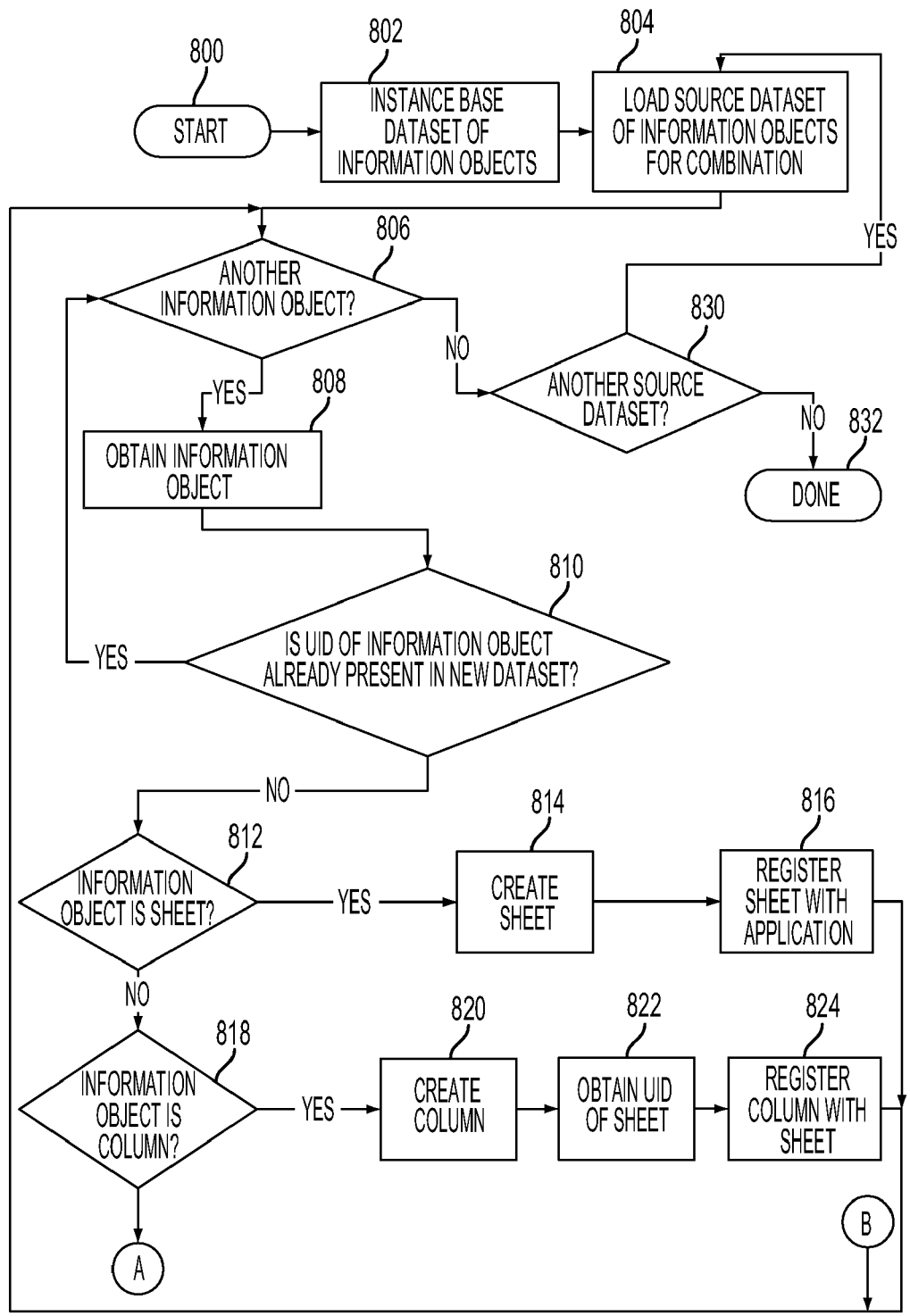
FIG. 8 is a functional flow diagram of information unit combination process.
Figure 9:
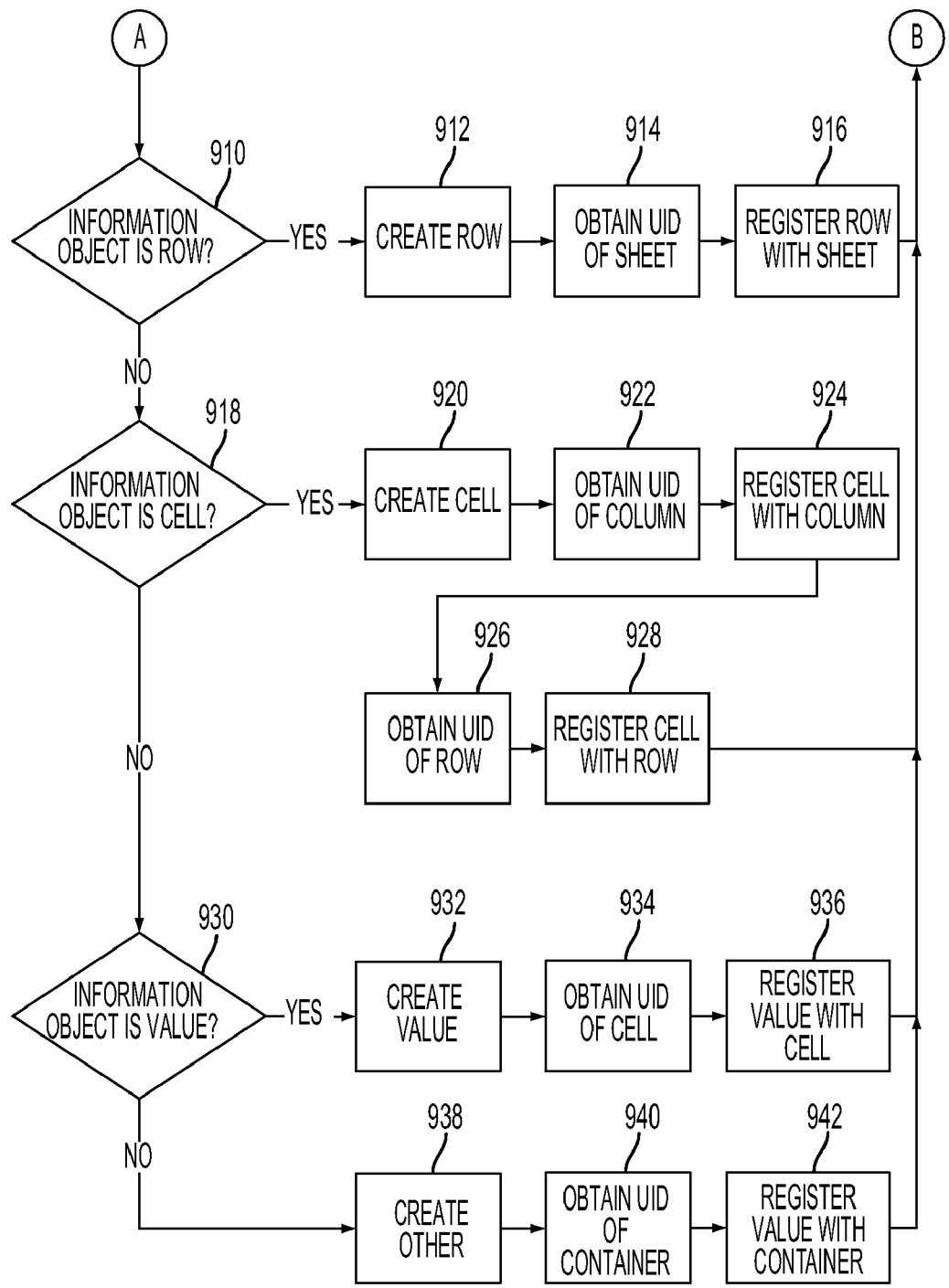
FIG. 9 is a continuation of the functional flow diagram of FIG. 8.

An exemplary combination method 800 is illustrated beginning in FIG. 8 and continuing through FIG. 9. A new base dataset of information objects is instanced in a block 802. Initially, the base dataset is a null set consisting of no entries into which datasets from collaborating users are combined. A source dataset from one of these collaborating users is obtained in a block 804 and interactively processed beginning with a decision 806. If the decision 806 finds that there is another information object in the source dataset, that next information object is retrieved in a block 808. The unique identifier associated with that next information object is checked against a list of unique identifiers already present in the base dataset by decision 810. If the unique identifier is already present, the repeated information object is redundant and it is discarded and the process returns control to the decision block 806, which looks for another information object in the source dataset.

If another action object is present, that information object is obtained in the block 808. The decision 810 that determines whether the unique identifier of the information object is already present in the base dataset. If it is not, program control is passed to a series of decisions that determine the type of information object and then both instance and initialize the appropriate object for inclusion in the base dataset. The initialization of a new information object in the base dataset includes associating that information object with the unique instance of its parent object in the base dataset, as discussed below with reference to FIG. 10.

A decision 812 determines whether the type of the information object is a sheet and, if so, creates and adds a sheet object to the base dataset in a block 814. The sheet object is then registered with the editor application in a block 816. Program control is then returned to decision block 806 to obtain the next information object from the source dataset. If information object is not a sheet, the information object is next checked in a decision 818 to determine if it is a column information object. If so, the column information object is created in a block 820 and the unique ID associated with the sheet information object to which the information object belongs is obtained in a block 822. The column information object is then registered with the sheet information object in a block 824 and program control is returned to decision 806.

Turning to FIG. 9, if the method 800 determined that the type of information object was not a column, a decision 910 determines whether the information object is a row. If so, a row information object is created and added to the base dataset in a block 912. The unique identifier of the sheet information object is obtained in a block 914 from the row information object and the row information object is registered with the sheet information object in a block 916. Program control is then returned to the decision 806 for processing of the next information object. If decision 910 determines the information object is not a row information object, control is passed to a decision 918.

Decision 918 determines if the type of information object is a cell information object. If so, a cell information object is created and added to the base dataset in a block 920. The unique identifier of the column information object is obtained in a block 922 from the cell information object and the cell information object is registered with the column information object in a block 924. The unique identifier of the row information object is obtained in a block 926 from the cell information object and the cell information object is registered with the row information object in a block 928. Program control is then returned to the decision 806 for processing of the next information object. If decision 910 determines the information object is not a cell information object, control is passed to a decision 930.

Decision 930 determines if the type of information object is a value information object. If so, a value information object is created and added to the base dataset in a block 932. The unique identifier of the column information object is obtained in a block 934 from the value information object and the value information object is registered with the cell information object in a block 936. During the collaboration process, it is likely that there will be a number of value information objects that are associated with a common cell information object represented in their local sheets. The cell information unit is identified with a unique identifier common to all copies of the cell information objects that are contained within the various datasets distributed for collaboration. Program control is then returned to the decision 806 for processing of the next information object.

A negative determination from decision 930 indicates a type of information unit that is not a tabular type. Since the methods and systems of the present invention are not limited to tabular data type, other types of information objects are created in a block 938 and assigned to the base dataset. The unique identifier of a container object is obtained in a block 940 from the information object and is registered with the container information object in a block 942. Program control is then returned to the decision 806 for the processing of the next information object.

Returning to FIG. 8, once all the information objects available in the source dataset have been processed, the decision 806 passes control to a decision 830. The decision 830 determines if there is another source dataset to process, for instance, from another collaborating user. If there is another source dataset to process, program control is directed to block 804, and processing continues as discussed above. Decision 830 will conclude the processing at block 832 once all source datasets have been processed.

Documentation Indicators

Returning to FIG. 2, the systems and methods of the present invention includes documentation indicators that provide visual indications of the availability of alternative values developed through the collaboration process. For example, a documentation indicator may be displayed through the user interface in many different ways, such as a distinct background color, hatching or graphically altering a background, or showing a border of differing color or width that surrounds the subject information unit. The various features of the present invention may each be indicated through the interface 200 using these or similar techniques. For example, documentation indicator 280 visually indicates that there are new or unexamined values that may be displayed by scrolling to the right of the interface 200. Documentation indicator 282 indicates that there are new or unexamined values that may be displayed by scrolling down in the interface 200. A documentation indicator 284 may also be displayed to indicate new or unexamined values available for a particular cell information unit, for example 286. Similarly, a documentation indicator 288 may span all or part of a column information unit 204 or a row information unit 202 (not shown). Documentation indicators 280-288 may also be used in all type of user interfaces, such as child or detail user interfaces.

Visual indicators may also be used for alternate purposes, such as a reminder indicator 290, that displays a visual cue indicating a suggestion that additional analysis might be appropriate for the cell information unit 220 with which the reminder indicator 290 is associated. Distinct documentation indicators 280-290 may similarly be employed to indicate changed values, values changed or contributed by particular users, high importance changes, changes requesting comments from other users, or values that have on displayed comments or the other information associated with those values. Each of the documentation indicators 280-288 or reminder indicators 290 may be configured to display or not or to only display in the context of particular users.

Another Exemplary Embodiment

Figure 10:
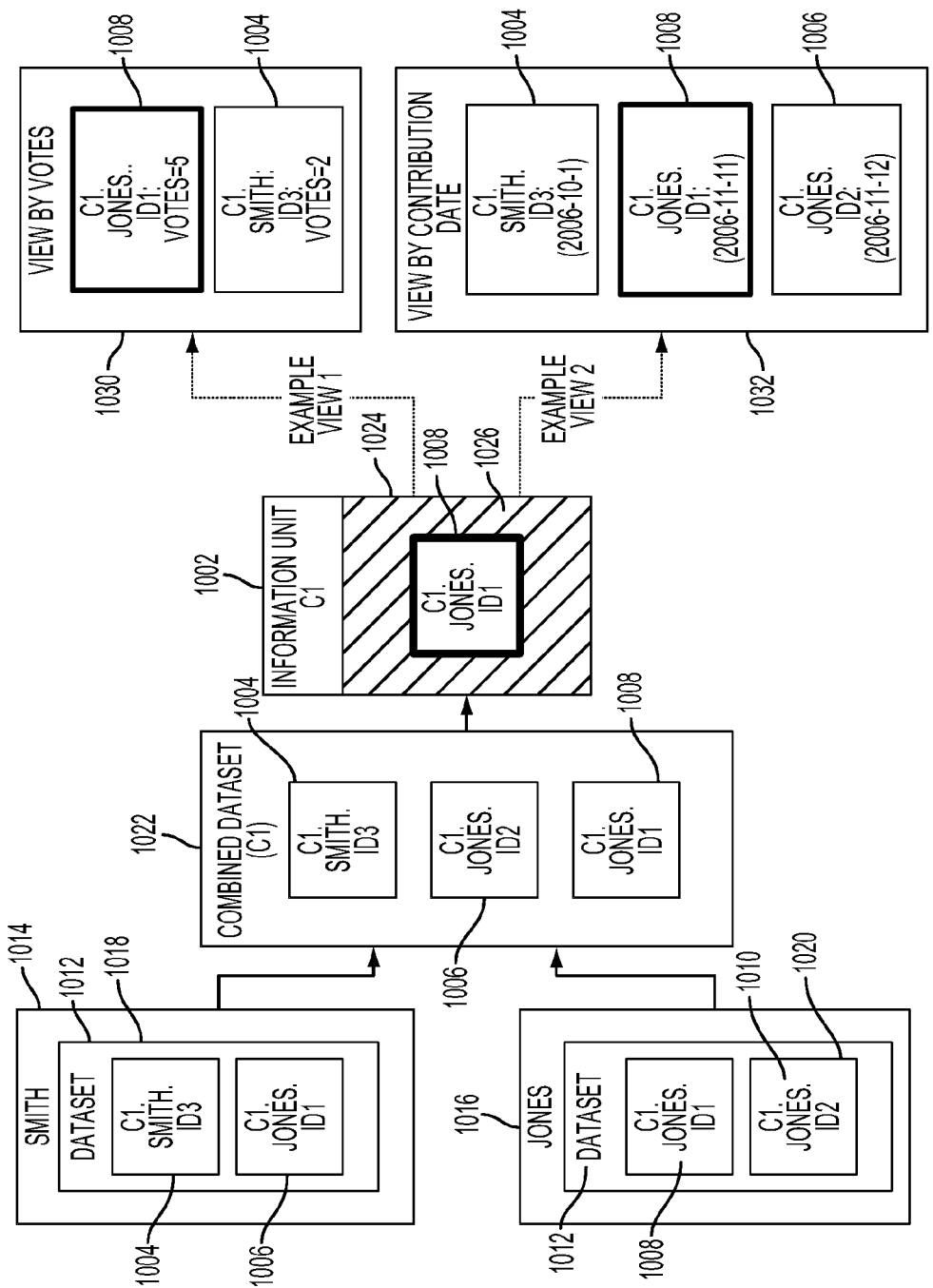
FIG. 10 is a block diagram of an exemplary combination and display of value information units associated with a cell information unit.

FIG. 10 illustrates an example of the combination and display of value information units 1004-1010 associated with a cell information unit 1002. While the example described only a cell information unit for clarity, the example can be applied to other information units. A base dataset 1012 is provided to collaborating user Smith 1014 and collaborating user Jones 1016, which becomes local datasets 1018-1020 for the use of the collaborating user. In the example, the local datasets 1018-1020 initially contain a single value information unit 1006-1008 copied from the base dataset 1012. The value information units 1006-1008 are different instances sharing the same unique identifier (ID1). Collaborating user Smith 1014 adds a new value information unit 1004 to his local dataset 1018 and collaborating user Jones 1016 adds a new value information unit 1010 to her local dataset 1020.

The local datasets 1018-1020 are transported and combined into a combined dataset 1022. The combined dataset 1022 includes a copy of each unique value information unit 1004, 1006 and 1010 contained in the local datasets 1018-1020 contributed by the collaborating users 1014-1016. Each of the value information units 1004, 1006 and 1010 are associated with cell information unit (C1) 1002 and are available for display. As value information unit 1008 is designated as the "top level" value, its text value is displayed in a cell information unit display window 1024.

A documentation indicator 1026 indicates that other value information units 1004, 1006 and 1010 are associated with the cell information unit 1002 and available for viewing. By selecting the documentation indicator 1026, for example by double-click or menu selection, additional interface elements 1030-1032 may be displayed. The presentation of the value information units 1004, 1006 and 1010 may be variously ordered and filtered. For example, in view 1030, the value information units 1004, 1006 and 1010 are filtered for those having more than two votes by collaborating users are displayed. The votes may have been retrieved from as meta-data associated with those value information units 1004 and 1008. View 1032 is another example, displaying the value information units 1004, 1006 and 1010 in the order of their contribution date, which might also be stored with the value information units 1004, 1006 and 1010 as meta-data.

Contributor Point-of-View Interfaces and Interaction

Figure 11:
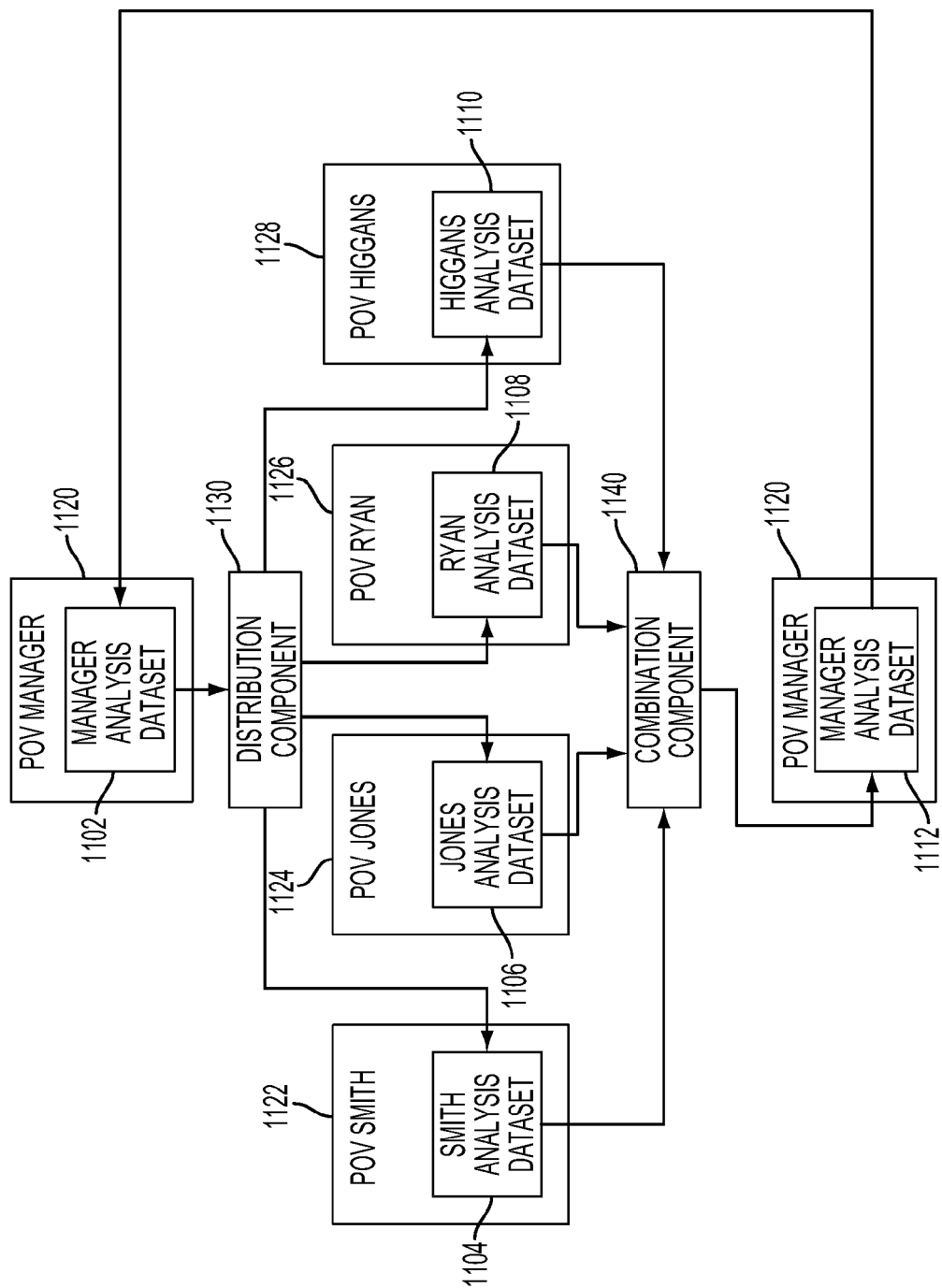
FIG. 11 is a block diagram of an exemplary collaborative information analysis with each participant using a point of view user interface.

An embodiment of the invention provides point of view user interfaces individually configurable by collaborating users. Turning to FIG. 11, an exemplary collaborative analysis begins with a manager defining a manager at analysis dataset 1102 as a starting point for a collaborative analysis. The manager at analysis dataset may initially be sparsely populated, but may contain initial topic information units and contribution information units. For example, the manager analysis dataset 1102 may contain evidence represented by row information units 202, hypotheses represented by column information units 204 and contribution information units such as values and comments.

Each collaborating user in the example works from their own point of view user interface 1120-1128. The point of view user interfaces 1120-1128 provide a user configurable environment for displaying, organizing and contributing to the collaborative analysis. A distribution component 1130 creates a copy of the manager analysis dataset 1102, which is provided to each of the collaborative users as a local instance of the analysis dataset 1104-1110. The collaborative user through his or her point of view user interface 1122-1128 may modify their local instances of the analysis dataset 1104-1110. The collaborative analysis may be an iterative process. At various times, the analysis performed by the individual contributing users may be combined and conformed by a combination component 1140. The local instances of the analysis datasets 1104-1110, as modified by the collaborating user of those local instances, are transported to one or more instances of the combination component 1140, where their contents are combined into a next iteration of the manager analysis dataset 1112. An example of the combination process is discussed above with reference to FIGS. 8-9. The next iteration of the manager analysis dataset 1112 is then distributed by in the distribution component 1130 and serves as the base analysis dataset for the next iteration of the collaborative analysis. In other embodiments, no single person acts as a manager and each contributor judges and combines information from others, each according to their own priorities and preferences.

Figure 12:
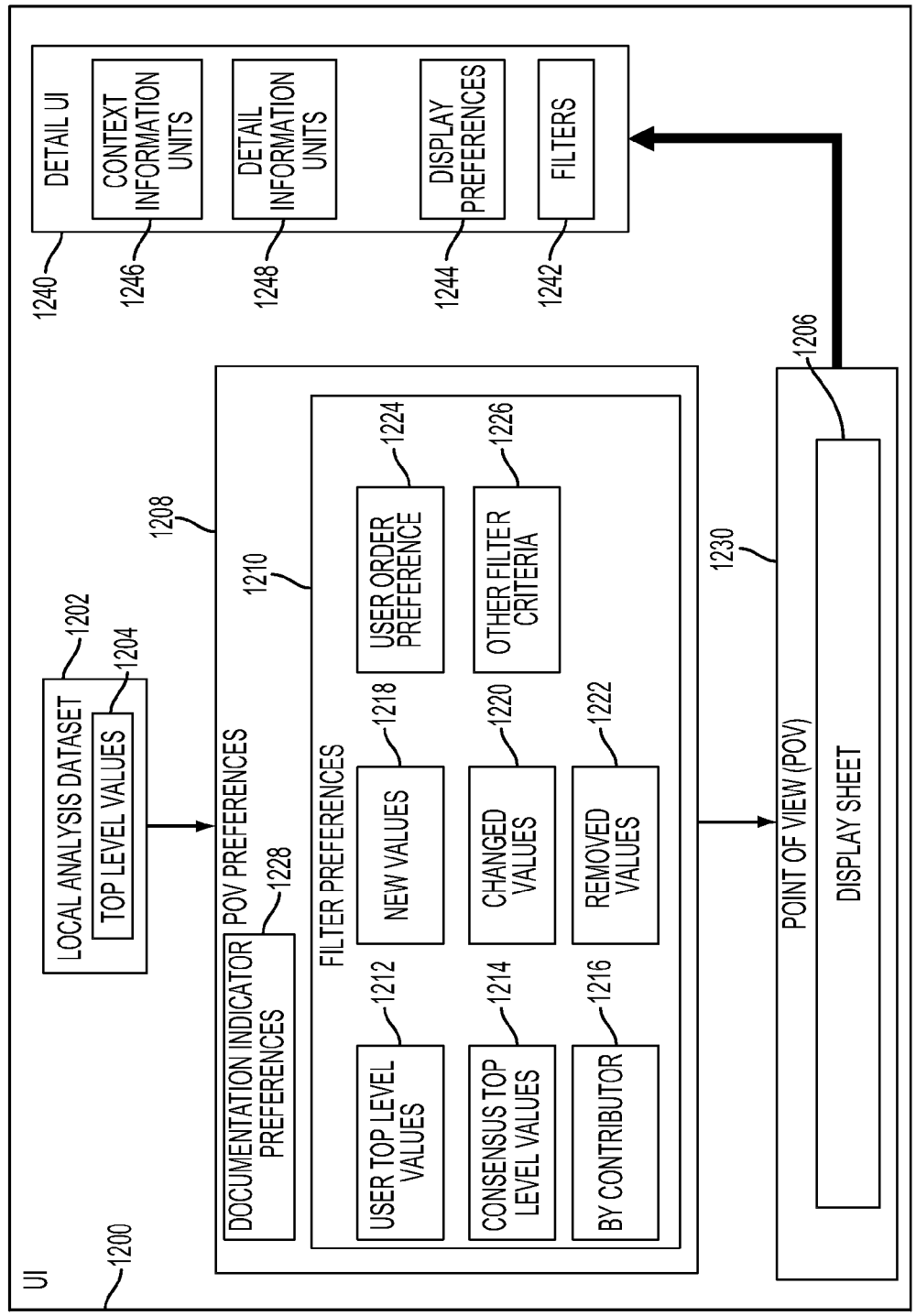
FIG. 12 is a block diagram of an exemplary point of view user interface.

The local instances of the analysis datasets 1104-1110 include the data to be displayed in the point of view user interfaces 1122-1128. The information units contained went in these local instances of the analysis datasets 1104-1110 may be filtered, organized, or otherwise configured according to the preferences of the collaborating user. Turning to FIG. 12, and an exemplary point of view user interface 1200 obtains data from a local analysis dataset 1202. The local analysis dataset 1202 may include meta-data that describes the information units contained therein. For example, the meta-data may indicate those of the information units that have been designated as top-level values 1204. A display sheet 1206 visually organizes the point of view user interface according to a set of point of view preferences 1208. The point of view preferences 1208 may be transferred and conformed by the manager as part of the collaborative process or may be maintained by the individual collaborative users.

Examples of point of view preferences include filter preferences 1210. A filter determine actions to be taken with regard to particular information in its in the local analysis dataset 1202. For example, the collaborative user may select for display those values that have been indicated as top-level 1214. Information units may be filtered by contributor 1216, to display only new values 1218 changed values 1220, or removed values 1222 by that user or other contributors. The display may show as top level the most recent values. It may use a plurality of factors (e.g. timestamp and contributor) in determining which values to display. The display of the information in the display sheet 1206 may also be organized, for instance, by specifying a preference for the order 1224 in which the information units are displayed. There are many other filters 1226 that may be used in the point of view display. Individual contributing users may also specify their preferences for documentation indicators 1228. The result of applying the point of view preferences 1208 appears in a point of view graphics area 1230.

As discussed above, detail user interfaces 1240 are available to view information units not displayed in the upper-level display sheet 1206. These detail user interfaces 1240 may apply their own filters 1242 in display preferences 1244. Context information, such as the information units 1246 that the detail information pertains to, together with the detail information 1248 may be displayed in the detail user interface 1240 and made available to modify.

Several of the above disclosed and other features and functions, or alternatives thereof, may be desirably combined into many other different systems or applications. While the methods and the systems have been illustrated in many cases using functional flow diagrams to provide a clear description of reasonable length, it should be noted that these diagrams may unnecessarily imply that what is described is necessarily sequential in nature. Many times, however, the actual sequence is unimportant. For the sake of brevity, all combinations possible for minor implementation details are not described, but are fully intended to be included in the spirit in scope of the description of the specification. Further, the claims can encompass embodiments in hardware, software, or a combination thereof. Various presently unforeseen or unanticipated alternatives, modifications, variations, or improvements therein may be subsequently made by those skilled in the art, which are also intended to be encompassed by the following claims.

What is claimed is:

1. A method for a collaborative analysis of information, wherein all the steps are performed on suitably programmed computers, comprising:
   maintaining an analysis dataset comprising information units, including:
      a plurality of topic information units represented as a matrix of hypotheses and evidence, each topic information unit representing an analysis topic, wherein various evidence values associated with each hypothesis represented by a value cell;
      a plurality of contribution information units each representing an information contribution associated with one of the analysis topics; and
      associating each contribution information unit with the respective topic information unit;
   obtaining a plurality of analysis datasets;
   generating a combined analysis dataset, comprising:
      determining a set of unique topic information units found in the plurality of analysis datasets;
      determining a set of unique contribution information units found in the plurality of analysis datasets for each unique topic information unit;
      associating an instance of each unique topic information units found in the set of unique topic information units with the combined analysis dataset; and
      associating an instance of each contribution information unit found in the set of unique contribution information units that was determined for each unique topic information unit with that unique topic information unit;
   designating one of the contribution information units associated with each topic information unit as a top-level value;
   displaying a visual representation of the topic information unit in a user interface; and
   displaying a visual representation of the contribution information unit that is designated as the top-level value in the user interface such that the information contribution is visually associated with the analysis topic.

2. The method of claim 1, further comprising:
   associating a unique topic identifier with each topic information unit; and
   determining the set of unique topic information units found in the plurality of analysis datasets based at least in part on the associated topic unique identifier.

3. The method of claim 2, further comprising:
   associating a unique contribution identifier with each contribution information unit; and
   determining the set of unique contribution information units found in the plurality of analysis datasets based at least in part on the associated unique contribution identifier.

4. The method of claim 1, further comprising:
   selecting the topic information unit for a detailed display in a detail interface; and
   displaying a visual representation of some or all contribution information units that are associated with the topic information unit in the detail interface.

5. The method of claim 4, further comprising:
   filtering a plurality of contribution information units for display in the detail interface according to a contributor filtering preference.

6. The method of claim 5, further comprising:
   formatting a plurality of contribution information units for display in the detail interface according to a contributor formatting preference.

7. The method of claim 6, further comprising:
   persisting either or both formatting and filtering information for individual contributors; and
   displaying the information units to the individual contributor as indicated by either or both the persisted formatting and the filtering information.

8. The method of claim 4, further comprising:
   displaying a documentation indicator to visually indicate the presence of information units in the combined analysis dataset meeting a filter criteria.

9. The method of claim 8, further comprising:
   displaying a documentation indicator to visually indicate the presence of information units in the combined analysis dataset meeting a filter criteria but not presently displayed within the graphic presentation of the user interface.

10. The method of claim 4, further comprising:
    persisting contributor preferences for individual contributors; and
    displaying the information units to the individual contributor as indicated by the contributor preferences.

11. A system having a storage medium for the collaborative analysis of information, comprising:
    a local analysis dataset, comprising information units, including:
       a plurality of topic information units represented as a matrix of hypotheses and evidence, each topic information unit representing an analysis topic wherein various evidence values associated with each hypothesis represented by a value cell; and
       a plurality of contribution information units each representing an information contribution associated with one of the analysis topics;
    a collaborative editor that associates a unique topic identifier with each information unit as the information unit is created, associates each contribution information unit with the respective topic information unit, and that associates each contribution information unit with the respective topic information unit;
    obtaining a plurality of analysis datasets;
    generating a combined analysis dataset, comprising:
       determining a set of unique topic information units found in the plurality of analysis datasets;
       determining a set of unique contribution information units found in the plurality of analysis datasets for each unique topic information unit;
       associating an instance of each unique topic information units found in the set of unique topic information units with the combined analysis dataset;
       associating an instance of each contribution information unit found in the set of unique contribution information units that was determined for each unique topic information unit with that unique topic information unit;
    designating one of the contribution information units associated with each topic information unit as a top-level value;
    displaying a visual representation of the topic information unit in a user interface; and
    displaying a visual representation of the contribution information unit that is designated as the top-level value in the user interface such that the information contribution is visually associated with the analysis topic.

12. The system of claim 11, further comprising:
    a transport managing component for obtaining the plurality of local analysis datasets from a plurality of contributing users in a distributed computer environment.

13. The system of claim 11, wherein the collaborative editor includes a point-of-view user interface configurable by a collaborating user participating in the information analysis.

14. The system of claim 13, wherein the set of top-level values is configured by a managing user.

15. The system of claim 13, further comprising a filtering component by which each collaborating user specifies filtering preferences for filtering the information units for display in the point-of-view user interface.

16. The system of claim 15, wherein the set of filtering preferences is configured by a managing user.

17. The system of claim 13, further comprising a formatting component by which each collaborating user specifies formatting preferences for formatting the information units for display in the point-of-view user interface.

18. The system of claim 17, wherein the set of formatting preferences is configured by a managing user.

19. The system of claim 13, further comprising a documentation indicator component by which each collaborating user specifies a set of documentation indicator preferences for displaying a visual indication of information units present in the local analysis dataset but not presently displayed in the point-of-view user interface.

20. The system of claim 19, wherein the set of documentation indicator preferences is configured by a managing user.

* * * * *